Patented May 30, 1939

2,159,981

UNITED STATES PATENT OFFICE 2,159,981

PRODUCTION OF THERMOSETTING MOLDING COMPOSITIONS AND MOLDED ARTICLES FROM NATURAL HORN

Stefan Bakonyi, Dessau, Germany, assignor to O. Kraus, Prague, Czechoslovakia

No Drawing. Application December 21, 1936, Serial No. 116,997. In Germany July 21, 1936

9 Claims. (Cl. 260—6)

My invention relates to the production of molding powders and molded articles of various kinds from natural horn by hot molding of horn powder. It is an object of my invention to provide means whereby powdered natural horn can be improved, molded and transformed to form a homogeneous solid mass possessing valuable properties.

Powdered natural horn substance has been molded at a temperature of 130 to 150° C., in certain cases together with the powdered phenolformaldehyde condensation product known under the trade name "Bakelite". The molded masses or articles thus obtained are however of little value, since they are prone to swell in contact with water, are subject to changes of volume, soon lose their gloss and are extremely brittle so that they can neither be turned nor planed nor bored. By treating them with formaldehyde, their gloss can be improved, however only superficially, and will soon disappear again. These phenomena are due to the fact that the unfavorable chemical and mechanical properties of the horn substance are still further impaired by the hot molding, even if the horn substance is mixed with other substances.

It has also been suggested to incorporate in condensation products of urea with formaldehyde and more especially in the mass resulting from the reaction between urea and formaldehyde horn meal as a filler.

From the ensuing example it will be seen that the substance used for carrying out my invention is horn meal produced by fine grinding of hooves.

I have further found that the chemical and mechanical properties of natural horn and of the masses or articles produced from it by molding can be improved to a surprising extent if the horn of hoof meal is acted upon by a suitable agent which brings about a chemical loosening up or disintegration of the horn substances thereof.

According to my invention I impregnate and plasticize the natural horn of hoof meal with urea or thiourea or both and with formaldehyde, or with the initial condensation product resulting from said substances, which I have found to act, at a temperature above about 130° C., as a plasticizer for this substance. Comparatively low quantities, for instance about one third or less of the mixture, of such plasticizer have been found sufficient to efficiently impregnate the hoof meal. I then dry the impregnated and plasticized product, which is thereupon finely ground and may be molded in the usual manner by hot-pressing at about 130 to 150° C. The press heat causes a mutual solution to take place between the natural horn of the hoof meal and the urea-formaldehyde condensation product the natural horn of hoof meal and the condensation product possessing similar structures. At the same time the urea-formaldehyde condensation product is hardened, i. e. converted into the infusible and insoluble product.

I thus obtain a molded shape which consists of natural horn meal produced from hooves which has undergone a chemical change by being disintegrated by way of solution with the urea resin and possesses surprising novel properties, which are superior to the properties of molded shapes made of natural horn or mixtures of natural horn meal and Bakelite. The new products do not undergo a change of their volume or shape and they possess a stable high gloss and excellent mechanical properties, being adapted to be readily and accurately turned, planed and bored. It is therefore possible to produce from the horn of hoof meal disintegrated or loosened chemically, according to this invention, all kinds of shapes and more especially articles of intricate shape, such as buckles, clasps, hooks, handles, cups, boxes, cases, tubes, combs and the like.

The molded shapes are as opalizing—translucent as the higest quality buffalo horn and even present superior esthetic and chemical and physical properties than natural horn. Since the new material is not subject to changes of volume, it can be shaped by compression together with metal.

In practising my invention I may for instance proceed as follows:

70 kgs. of the powder (produced by fine grinding of hoofs, which I have found to form the best starting material for the purpose in view) are mixed in a highly efficacious kneading machine with 18 kgs. urea, 36 kgs. formaldehyde of 40% and 3 kgs. ammonia solution saturated in the cold. The mixture is kneaded some hours at room temperature without heating, until the hoof meal has absorbed the other substances and a homogeneous mass has resulted. This mass, which is a moist powder, is dried with care and finely ground. By further drying it carefully below about 70° C., the resistivity of the powder against the action of water is improved by hardening. Care must be taken not to overharden the substance, since otherwise it might lose its thermo-setting properties. The desired degree of hardening can easily be ascertained by hot-molding tests.

The proportions of the constituents forming the mixture may be varied within wide limits, but for economic reasons such proportions will be preferable, which contain the greatest possible quantity of the low-priced hoof meal. If one tries to still further reduce the percentage of urea and formaldehyde mentioned in the example, the properties of the final product are gradually impaired, since then the natural horn cannot sufficiently be disintegrated or loosened.

The urea may be replaced partly or altogether by thiourea, the formaldehyde by para-formaldehyde without any material change in the proportions. Hexamethylene tetramine may be added and so can pigments, fillers and softeners.

Various changes may be made in the details disclosed in the foregoing specification without departing from the invention or sacrificing the advantages thereof.

I claim:—

1. The process of producing a thermo-setting powder, adapted to be shaped by hot molding, from natural horn which comprises impregnating an ingredient consisting essentially of hoof meal formed by the grinding of hooves with urea and an aldehyde, and drying, grinding and hardening the mixture in such manner that the hardened product can be molded at a temperature ranging between about 130 and 150° C. to form permanently glossy shapes which do not swell, are not subject to changes of volume or shape and can be turned, planed and bored.

2. The process of claim 1, in which the hoof meal is mixed with urea and formaldehyde.

3. The process of claim 1, in which the hoof meal is mixed with thiourea and formaldehyde.

4. The process of producing a thermo-setting powder, adapted to be shaped by hot molding from natural horn, which comprises impregnating hoof meal formed by the grinding of hooves and composed essentially thereof with urea and an aldehyde in the presence of a condensing agent, and drying, grinding and hardening the mixture in such manner, that the hardened product can be molded at a temperature ranging between about 130 and 150° C. to form permanently glossy shapes which do not swell, are not subject to changes of volume or shape and can be turned, planed and bored.

5. The process of producing a thermo-setting powder, adapted to be shaped by hot molding, from natural horn which comprises impregnating hoof meal formed by the grinding of hooves and composed essentially thereof with urea and an aldehyde in the presence of ammonia, and drying, grinding and hardening the mixture in such manner that the hardened product can be molded at a temperature ranging between about 130 and 150° C. to form permanently glossy shapes which do not swell, are not subject to changes of volume or shape and can be turned, planed and bored.

6. The process of claim 1, in which 70 parts by weight hoof meal are mixed with 18 parts urea, 36 parts formaldehyde of 40% and 3 parts ammonia solution saturated in the cold.

7. The composition of claim 9, more than 50 per cent of which is hoof substance.

8. As a new composition which is waterproof, substantially free from expansion and contraction tendencies, fit to be turned, planed and bored and possessing a relatively permanent high gloss; a heat- and pressure-molded mixture comprising an ingredient consisting essentially of hoof meal formed by the grinding of hooves and an initial urea aldehyde condensation product.

9. A new composition suitable for heat and pressure molding to form waterproof products free from expansion and contraction tendencies, fit to be turned, planed and bored and possessing a permanent high gloss, which comprises an ingredient consisting essentially of hoof meal formed by the grinding of hooves impregnated with relatively small amounts of an initial urea aldehyde condensation product.

STEFAN BAKONYI.